United States Patent
Lipper et al.

(10) Patent No.: US 7,700,677 B2
(45) Date of Patent: Apr. 20, 2010

(54) PROCESS FOR DISSOLVING POLYVINYL CHLORIDE RESIN FOR THE MANUFACTURE OF PVC SOLUTION

(75) Inventors: Moshe Lipper, Netanya (IL); William Gay Hughes Games, Hadera (IL)

(73) Assignee: E.M.A.T. Technologies Ltd., Haifa (IL)

(*) Notice: Subject to any disclaimer, the term of this patent is extended or adjusted under 35 U.S.C. 154(b) by 1042 days.

(21) Appl. No.: 10/557,421

(22) PCT Filed: May 19, 2004

(86) PCT No.: PCT/KR2004/001179

§ 371 (c)(1),
(2), (4) Date: Jan. 26, 2006

(87) PCT Pub. No.: WO2004/101654

PCT Pub. Date: Nov. 25, 2004

(65) Prior Publication Data

US 2007/0060689 A1    Mar. 15, 2007

(30) Foreign Application Priority Data

May 19, 2003  (KR) .................. 10-2003-0031515

(51) Int. Cl.
*C08K 5/07* (2006.01)
*C08K 5/092* (2006.01)
*C08K 5/52* (2006.01)

(52) U.S. Cl. .................. 524/356; 524/147; 524/306; 524/303; 524/294; 524/297

(58) Field of Classification Search .............. 524/147, 524/334, 350, 356, 306, 303, 294, 297
See application file for complete search history.

(56) References Cited

U.S. PATENT DOCUMENTS 3,475,218 A * 10/1969 Torrenzano et al. ........... 134/10
3,928,267 A    12/1975 Rhodes et al.
4,369,273 A *  1/1983 Snel ........................... 524/89
4,721,773 A    1/1988 Yoshida et al.
5,374,377 A * 12/1994 Nguyen et al. ......... 252/301.36
5,675,914 A   10/1997 Cintron

FOREIGN PATENT DOCUMENTS

| DE | 81 223 | 4/1971 |
| JP | SHO54-111543 | 8/1979 |
| JP | 59-162564 A | 9/1984 |
| JP | 60-015433 A  * | 1/1985 |
| JP | 60-015433 A2 | 1/1985 |
| JP | 60-120019 A | 6/1985 |
| JP | 6-279614 A | 10/1994 |
| JP | 08-127745  * | 5/1996 |
| JP | 8-127745 | 5/1996 |
| JP | 9-77942 | 3/1997 |

OTHER PUBLICATIONS

Geerissen, H., et al., "Continuous fractionation and solution properties of PVC, 5$^{a)}$ Pressure dependence of the viscosity—Influence of solvent", *Makromal. Chem.* vol. 186, pp. 787-799, (1985).

* cited by examiner

*Primary Examiner*—Ling-Siu Choi
(74) *Attorney, Agent, or Firm*—The Nath Law Group; Susanne M. Hopkins; Ari G. Zytcer

(57) ABSTRACT

The present inventions relates to a process for the preparation of a PVC homopolymer solution containing PVC in concentration greater than 5 wt %, comprising adding solid PVC to an organic solvent containing a dissolving agent selected from phthalates, adipates, phosphates, sebacates and azelates, and stirring the same until a clear solution is obtained, a process for the manufacturing of the PVC sheet, comprising applying the PVC, homopolymer solution, and a PVC film, whenever manufactured by the process of the PVC sheet. The present invention provides a process for the preparation of the PVC homopolymer solution, the transparent solution which is stable and in which no precipitation or gel formation occurs for long periods of time, the PVC dissolving solution without applying any external heat, and the PVC sheet by efficient and inexpensive method.

13 Claims, No Drawings

PROCESS FOR DISSOLVING POLYVINYL CHLORIDE RESIN FOR THE MANUFACTURE OF PVC SOLUTION

TECHNICAL FIELD

The present invention relates to an improved process and method of dissolving Polyvinyl Chloride (PVC) resin by cold process, a method of producing of PVC dissolving solvent which is transparent for long periods of time, and PVC sheet, PVC film which is produced by efficient and inexpensive method.

BACKGROUND ART

The dissolving of polyvinyl chloride resin is well-known process. Usually the PVC is produced by either bulk, suspension polymerization, or emulsion polymerization techniques. The polymerization step is carried out in a reactor vessel and PVC resin scale is normally formed on the internal surface wall of the reactor surface. The need to periodically remove the PVC deposit has been a challenge for the industry for many years. Among other dissolving, different organic solvents have been used, for example tetrahydrofuran (HEF), as described in U.S. Pat. No. 3,475,218. The use of pure THF has not been accepted by the industry, however, due to its danger and toxicity.

The above problems led to the use of other solvents, such as methyl ethyl ketone (MEK) or toxic solvent such as dimethylsulfoxide (DMSO), or their mixtures. MEK is readily available material with a convenient boiling point of 76.6° C.

Macromol, Chem, 1486. 787-799(1985) describes the solution properties of PVC copolymer in various organic solvents like Cyclohexanone, MEK, THF, Acetylacetone and other, This publication shows the viscosity results of 8% PVC in the different media.

DD 81223 describes a process for obtaining low concentrations of PVC in Chloroform or in Dichloroethylene, at high temperatures (80-95° C.), with the need for steam bubbling during the process.

JP 59162564 teaches the use of Xylen/THF mixtures to form 10% PVC solution.

However, according to this patent, a gel and not a clear solution is formed.

U.S. Pat. No. 5,675,914 describes regenerating PVC from waste and similarly in JP 06279614 the recovery of PVC from PVC-coated waste electric wires is described. Multi-component stabilizers are extensively utilized to protect the resins against oxidative, thermal and photochemical degradation. Usually polyhydric alcohols and metals of carboxylic acid, are used.

U.S. Pat. No. 3,928,267 teaches the formation of PVC blends comprising organic phosphates, epoxidized soybean oil and dioctylazelate. The patent describes the formation of PVC paste, which is not a suitable form for spray application. The above blending process requires high temperature of 177° C.

U.S. Pat. No. 4,369,273 teaches the formulation of a powder mixture of PVC blended with alpha and beta-naphthindoles, epoxy soybean oil and trinonyl-phenyl phosphite as stabilizers. According to this patent soft PVC is formed, which is suitable for film and for injection molding articles. The process temperature of this patent is greater than 100° C.

All the above reference deals either with the use of PVC copolymer or requires the use of high temperatures and toxic solvents. Prior art procedures result either in low-concentration PVC solution, which is unsuitable for spray applications.

The usual application of PVC copolymer is in inks, as paints and as adhesives. However PVC homopolymer solution is advantageous as compared to PVC copolymer solutions, because of its lower price and its better chemical, heat and UV resistance.

Furthermore, it exhibits mechanical properties (e.g. impact & tensile strength), which enables its use as both a flexible and rigid building material.

DISCLOSURE OF INVENTION

The present invention provides for the dissolution of relatively high percentage of PVC homopolymer, thus minimizing the amount of PVC solution required for spraying or coating application, thus increasing the economical advantage of the product and minimizing the ecological adverse effects. Accordingly, it is an object of the present invention to provide a method for the preparation of homopolymer PVC solution having PVC concentration of up to 22% that is not obtained according to the prior art.

It is another object of the invention to provide transparent solution which are stable and in which no precipitation or gel formation occurs for long periods of time, of the order of one year or more.

It is another object of the invention to provide a method for dissolving PVC resin without applying any external heat.

It is still further object of the invention to provide an easy, efficient and inexpensive method, using a PVC solution of the invention, for the manufacturing of sheets by known spray or coating techniques.

The invention relates to a process of manufacturing of homopolymer PVC solution, which can be further used to deposit continuous film PVC layers over various surfaces. In one aspect, the invention is directed to the preparation of a PVC homopolymer solution containing PVC in a concentration greater than 5 wt %, comprising adding solid PVC to an organic solvent containing a dissolving agent, and stirring the same until a clear solution is obtained. As will appreciated by the skilled person, the order of addition of the PVC and of the dissolving agent can be inverted, if desired.

According to preferred embodiment of the invention, the concentration is greater than 5 wt %, preferably 14-16 wt % according to still another preferred embodiment of the invention, the PVC is dissolving in MEK.

According to another preferred embodiment of the invention, the dissolving agent is selected from softeners like phthalates, adipates, azelates, phosphates agent are dioctyl phthalate (DOP), tri(2-ethexyl)phosphate and dioctyladipate (DOA).

According to another preferred embodiment of the invention, the dissolving agent is the internal heat (up to 52° C.) created by the scission power obtained by the dissolver stirring at 1400 rpm.

The PVC solution can be used to manufacture a film by applying it to a surface by spraying, brushing or dipping.

BEST MODE FOR CARRYING OUT THE INVENTION

A PVC solution can be prepared, which can be further used to deposit continuous film PVC layers over various surfaces. This film can be formed either by spraying of by other coating techniques. In order to achieve a clear and stable PVC solution, the dissolving process usually begins with the introduction of a dissolving agent, the nature of which will be further discussed below, into an organic solvent, followed by a homopolymer PVC resin. Both the dissolving agent and the PVC are preferably poured and mixed at a well-controlled rate. The PVC solution is obtained as a clear solution. The PVC can further be formulated by adding to it various conventional plastic additives, such as stabilizers, pigments and fillers.

Unless otherwise specifically stated, throughout this specification the PVC concentration is expressed in percentage by weight (wy %), and defined as the percentage of mass of PVC relative to total weight of the solution including the sum of the weights of PVC and softeners as the dissolving agent. The dissolving agent concentration is also expressed in wt %, and is defined as the weight percentage of the dissolving agent (softeners) 100 g of solvent.

The PVC solution of the present invention can be of varying viscosity, thus the term "solution" may also encompass pseudo-plastic system. Unless otherwise specified, all percentages given herein are by weight.

A dissolution process generally comprises the following steps, given hereinafter together with illustrative and non-limitative exemplary.

A dissolving softeners agents (4-18 kg) (selected from phtalates, adipates or phosphates, azelates, sebacates and epoxidized soybean oil) is added to 140 liter of methylethylketone (MEK), at a constant rate of 4 kg/min. The mixture is continuously stirred for 30-40 minutes.

Homopolymer PVC resin, K value 55-58 is added gradually during 20-30 minutes to the above solution, at a rate of 2 kg/min, to obtain a PVC concentration of approximately 14-20% by weight. The solution is continuously stirred at a controlled rate till 45 minutes after the solution reach the temp. of at least 50° C.

The dissolution process is performed without applying external heat. The formed PVC solution is checked for clarity and is transparent for at least on year without any noticeable get precipitation.

The formulation of the PVC solution can be made into a concentrated "ready-to-use" form, by adding conventional additives to the original PVC solution, such as heat and UV stabilizers, pigments, ($TiO_2$, microlites etc.), fillers ($CaCO_3$, silicates etc.), dispersing agents and deformers etc., thus reducing the solvent concentration.

According to the invention, if additional solution concentration is required fillers or plasticizers can be added.

The PVC formed according to the above processes can be utilized in several applications as demonstrated in Examples 3, 7 and 8.

If required, the PVC film obtained according to the invention can be easily refreshed or peeled-off from the surface and the PVC film may be recycled for further use. The PVC sheet manufactured according to the invention can serve as an efficient barrier for wetness, marine and acidic atmosphere, dust and sand storms, and exhibit chemical resistance.

The following examples illustrate the invention and are not intended to limit it in any way.

Example 1

16 Kg of DOP were added to a 200-liter tank containing 112 Kg of MEK. The DOP was poured at a rate of 3 Kg/min and this solution was continuously stirred. Upon completion of the addition of DOP, stirring Proceeded for another 15 minutes.

22 Kg of PVC homopolymer K value 55-58 were added to the above solution at a rate of 2 kg/min and the solution was stirred at 700 rpm. Upon completion of the addition of the PVC, the solution was mixed for another 30 minutes and then the stirring rate was raised to 1400 rpm till the solution reached the internal heat of at least 50° C.

Example 2

The PVC solution formed in Example 1 was concentrated to 24.7% of the original solution volume to produce a dry sheet. The drying time on contact was 5-10 minutes at 23° C., depending on the formed layer thickness. The above solution can be used as basic material for the production of PVC sheet for use in several industrial applications, by adding 0.7 kg of butyltin mercaptide, heat stabilizer, (irgastad-T22M, ex CIBA), and 0.6 kg of a methadone, 2-hydroxy-4-(octyloxy)-phenyl, UV absorder (chemisorb 81, ex CIBA).

Example 3

6 Kg of titanium dioxide ($TiO_2$) and 4 kg of calcium carbonate were added to the PVC solution of Example 1. The solution was sprayed over a polished steel breaking drums in vehicle.

The spraying was performed directly on the drum by an airless procedure, using a pressure of 6000 psi. This enables a complete peripheral coating of the drum. The produced sheet layer was 250 microns thick. Drying time for touch was 6 minutes at 21° C. Complete dryness was achieved after 4 hours. The coated drum was immersed in 10% HCl acid solution for 2 weeks. After this period the drum was removed from the acid solution, and the coating layer was manually completely peeled off. The drum was full intact with no signs of corrosion spots.

Example 4

18 kg of tri(2-ethylhexyl)phosphate were added to a 200-liter tank containing 112 kg of MEK. Addition was effected by pouring at a rate of 2 kg/min and the resulting solution was continuously stirred. Upon completion of the addition, the stirring solution for another 15 minutes.

22 kg of PVC homopolymer resin were added to the solution at a rate of 2 kg/min and the solution was stirred at 600-700 rpm. Upon completion of the PVC addition, the solution was mixed for another 15 minutes and then the stirring rate was elevated to 1400 rpm till the solution reached the internal heat at least 50° C.

Example 5

$TiO_2$ (8 kg), Irgastab-T22M (0.7 kg-heat stabilizer), Cheisorb 81 (0.6 kg), (UV absorber) and phthalocyanine Bulk (2 kg) were added to the PVC solution of Example 4. Reinforced sheet (8×4 meter) were prepared as follow:

A 600 microns thick PVC solution (wet layer) from the above example was dried to produce a 200 microns thick continuous dry sheet. This step was followed stamping of the reinforcing fabric (140 gr/m). The reinforced fabric width was 1 meter and connecting pieces having 5 cm overlapping produced the final width. The sheet thickness was increased by spray application of the above solution, which resulted in a final thickness of 450 microns dry sheet.

Example 6

14 kg of dioctyl adipate (DOA) were added to 200-liter tank containing 112 kg MEK. The DOA was poured at a rate of 3 kg/min and this solution was continuously stirring. Upon completion of the DOA pouring, the stirring proceeded for another 15 minutes.

22 kg of homopolymer resin were added to the solution at a rate of 2 kg/min and the solution was stirred at 600-700 rpm. Upon completion of the PVC addition, the solution was mixed for another 15 minutes and then the stirring rate was raised to 1400 rpm till the solution reached the internal heat at least 50° C.

Example 7

$TiO_2$ (8 kg), Irgastab-T22M (0.9 kg), Chemisorb 81 (0.9 kg), and Phthalocyanine Bulk (1 kg), were added to the solution formed in Example 6. The final solution was concentrated to 25.8% of the original volume to produce flexible sheet. The drying time on contact was 5-10 minutes at 23° C. depending on the formed layer thickness. The above solution can be applied as basic material of flexible PVC sheet for use in applications requiring service at low temperatures.

Example 8

This example demonstrated the coating of unpainted concrete walls of swimming pool by spraying them with a solution of Example 6, thus forming continuous flexible dry sheet, suitable for use at low temperatures. The solution described in Example 6 was diluted to 30% by volume MIBK, and was sprayed on the dry walls until saturation drops were seen. After 30 minutes, several additional layers were sprayed to obtain a 300 microns coating thickness. Then a 140 gr/m fiberglass reinforcing fabric was stamped over. After 30 minutes of drying, several additional layers of the solution of Example 6 were sprayed to obtain a final thickness of 900 microns. The pool was filled with water after 3 days.

Example 9

This example demonstrates the regeneration of an aged dry PVC sheet. The surface of the water pool of Example 8 was regenerated after 6 years of service. During this service period, the water contained relatively high concentration of Sodium, Chlorine and Sulfur ions.

The pool surface was cleaned with detergents, rinsed with water and dried. A solution contained 30% DOA, 6% Chemisorb 81.4% Irgastab T22M and 60% MEK was prepared and brushed over the surface. The dry surface was wiped with mops soaked with MEK/MIBK mixture wiping small areas each time. The remaining west areas were sprayed with solution of Example 6, to which $TiO_2$ and Halogen Blue L 7080 were added. After 24 hours drying time, the pool was filled with water and was fully operational.

INDUSTRIAL APPLICABILITY

According to the present invention, The present invention provides a process for the preparation of the PVC homopolymer solution, the transparent solution which is stable and in which no precipitation or gel formation occurs for long periods of time, the PVC dissolving solution without applying any external heat, and the PVC sheet by efficient and inexpensive method.

What is claimed is:

1. A process for the preparation of a PVC homopolymer resin solution containing PVC homopolymer resin in concentration greater than 5 wt %, said process comprising:
    adding solid PVC homopolymer resin to an organic solvent containing a dissolving agent, wherein the organic solvent is at least one ketone and the dissolving agent is selected from the group consisting of a phthalate, an adipate, a phosphate, a sebacate and an azelate; and
    stirring same until a clear solution is obtained.

2. The process according to claim 1, wherein said ketone is selected from an acetone, methyl ethyl ketone (MEK), methyl isobutyl ketone (MIBK) and a cyclohexanone and a combination thereof.

3. The process according to claim 1, wherein the PVC homopolymer resin concentration is 14 wt %.

4. The process according to claim 1, wherein the PVC homopolymer resin concentration is 16 wt %.

5. The process according to claim 1, wherein said dissolving agent is a plasticizer.

6. The process according to claim 5, wherein said dissolving agent is selected from dialkyl phthalate or an alcohol derivative thereof.

7. The process according to claim 5, wherein said dissolving agent is selected from trialkyl phosphates and triatyl phosphates.

8. The process according to claim 5, wherein said dissolving agent is a dialkyl adipate selected from dimethyl, dibutyl, dioctyl, and didecyl adipate.

9. The process according to claim 5, wherein said dissolving agent is selected dioctyl azelate.

10. The process according to claim 5, wherein said dissolving agent is epoxidized soybean oil.

11. A process for the manufacture of a PVC homopolymer sheet comprising applying a solution produced by the method of claim 1 to a surface, drying said applied solution on said surface, and peeling off the resulting sheet.

12. The process according to claim 6, wherein said dialkyl phthalate is selected from dimethyl, dibutyl, dioctyl, diisooctyl, and didecyl phthalate and said alcohol derivative is butyl-benzyl phthalate.

13. The process according to claim 7, wherein said trialkyl phosphate is selected from tri-(2-ethylhexyl)phosphate and tributyl phosphate and said triaryl phosphate is triphenyl phosphate.

* * * * *